(12) United States Patent
Hughes

(10) Patent No.: US 8,488,876 B2
(45) Date of Patent: Jul. 16, 2013

(54) METHOD AND SYSTEM FOR MANAGING COLOR PROFILES DURING COLOR DEVICE CALIBRATION

(75) Inventor: Richard Hughes, London (GB)

(73) Assignee: Red Hat, Inc., Raleigh, NC (US)

( * ) Notice: Subject to any disclaimer, the term of this patent is extended or adjusted under 35 U.S.C. 154(b) by 43 days.

(21) Appl. No.: 13/306,213

(22) Filed: Nov. 29, 2011

(65) Prior Publication Data
US 2013/0136356 A1   May 30, 2013

(51) Int. Cl.
*G06K 9/2003* (2006.01)
(52) U.S. Cl.
USPC ............ 382/163; 382/162; 382/165; 382/167
(58) Field of Classification Search
USPC ................. 382/100, 103, 104, 113, 162, 163, 382/166, 167; 358/3.23, 19, 517, 518; 345/604; 347/19; 715/253, 254; 156/252, 277
See application file for complete search history.

(56) References Cited

U.S. PATENT DOCUMENTS 8,023,156 B2 *  9/2011  Mestha et al.  ............... 358/3.23

* cited by examiner

*Primary Examiner* — Anh Do
(74) *Attorney, Agent, or Firm* — Lowenstein Sandler LLP

(57) ABSTRACT

A method and system for managing the application of a color profile to a color device in connection with a calibration event associated with the color device. A color management module is configured to detect a request to inhibit application of color profile received from a calibration module. The color management module facilitates the removal of a current profile applied to the color device. The color management module monitors a connection used to communication with the calibration module to identify a termination event associated with the calibration module and/or calibration event. In response to identifying the termination event, the color management module facilitates the application of a color profile to the color device.

21 Claims, 4 Drawing Sheets

METHOD AND SYSTEM FOR MANAGING COLOR PROFILES DURING COLOR DEVICE CALIBRATION

TECHNICAL FIELD

Embodiments of the present invention relate to computing systems, and more specifically, to managing color devices associated with a computing system.

BACKGROUND

Computing systems typically have numerous color devices (i.e., devices that display or produce color) such as, for example, printers, scanners, cameras, and displays. Frequently, it is desirable to perform characterization and/or calibration testing on the color devices in order to measure the performance and/or adjust the color device to perform in a certain manner. For example, a characterization test may be conducted in order to measure the current performance of the color device (e.g., test a display to determine a truest blue the display can produce). In another example, a calibration test may be conducted in order to adjust the parameters of a display in order to produce a desired output.

Computing systems often employ a calibration tool (i.e., a calibration module), such as a software program or daemon, configured to perform the characterization and/or calibration testing on the color devices (herein collectively referred to as a "calibration event"). In order for the calibration tool to properly conduct the desired calibration event, any existing color or characterization profile applied to the color device is typically removed. For example, when a display is calibrated, all display compensation profiles are removed from the display so that the calibration module can test the display in its native state (i.e., with no profiles applied).

Conventional computing systems usually lack a framework to manage profile settings in conjunction with a calibration event. In some instances, users are forced to manually delete manufacturer installed profiles from the computing system prior to the calibration event, and then manually re-install those profiles after calibration.

Furthermore, without a framework, a problem may occur when the calibration tool experiences a termination event such as for example, a forced quit, crash, unexpected exit, a reload, or the successful completion of the calibration event. In such cases, following the termination event, the color device that underwent the calibration event typically remains in the native (or default) state, without any profile.

An additional problem exists with conventional calibration systems in that calibration events that are interrupted and do not complete typically leave a color device in a partially calibrated state. Disadvantageously, the partially calibrated state may appear to the naked eye to be fully calibrated, when in fact the calibration event was not completed. This is particularly problematic for users, such as computer graphic artists, who usually require a very high level of precision and accuracy in the output of their color devices. For example, a graphics artist may be unaware that a calibration event was terminated when the color device was only 95% calibrated. Moreover, the artist may not be able to visually detect that the calibration was not completed, and would proceed under the false impression that the color device had been 100% calibrated.

DETAILED DESCRIPTION

Figure 1:
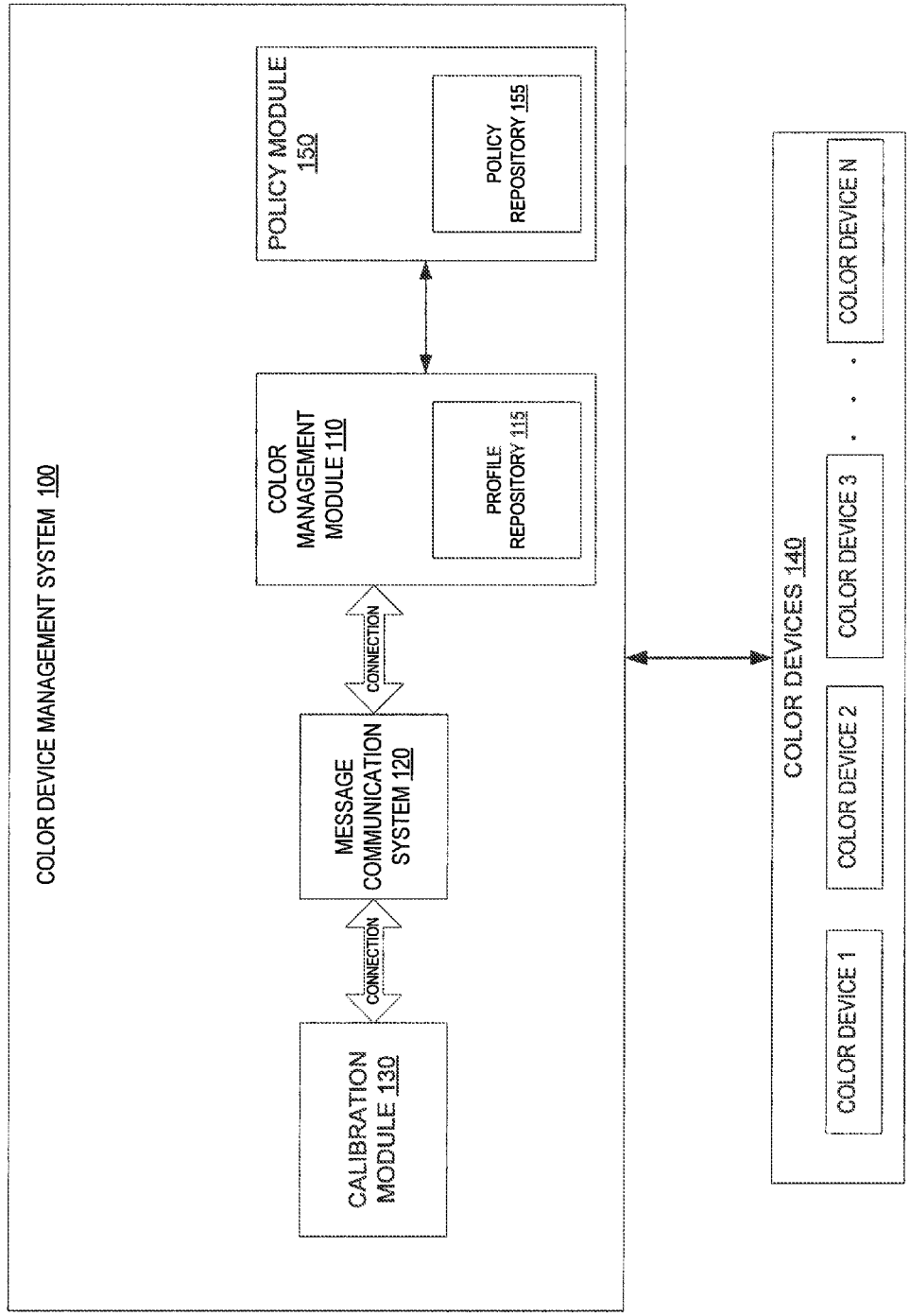
FIG. 1 is a block diagram of an exemplary computing system according to embodiments of the invention.

Methods and systems for managing color characterization profiles in conjunction with a calibration event relating to a color device. A color device is any device capable of rendering, displaying, producing, receiving, and/or transmitting color, such as, for example, a printer, a scanner, a display/monitor, and a camera. A color management system includes a calibration module coupled to a color management module via a message communication system. The calibration module may be a software program or daemon configured to perform the calibration event. The calibration event may include any measuring, testing, adjusting, characterizing, analyzing, and/or calibrating of a color device, such as, for example, a characterization test or a calibration test. A characterization test may be conducted in order to measure the current performance of the color device (e.g., test a display to determine a truest blue the display can produce). A calibration test may be conducted in order to adjust the parameters of a display in order to produce a desired output.

The color management module may be a software program or daemon configured to maintain a profile repository including a list of profiles associated with the color devices of the computing system. The color device management system may also include a policy module configured to apply color profiles to the color devices based on instructions received from the color management module.

In an embodiment, upon initiation by the calibration module of a calibration event associated with a color device, a request to inhibit application of a color profile to the color device is communicated to the color management module via a message communication connection. The message communication system may be any suitable inter-process call (IPC) system or inter-process communication bus, such as D-bus. In an embodiment, the color management module detects the request to inhibit by monitoring the connection with the calibration module.

In response to detecting the inhibit request, the color management module may instruct the policy module to remove a current profile applied to the color device. The removal of the current profile places the color device in its native state (i.e., with no profile) and ready for performance of the calibration event by the calibration module.

The color management module may monitor the connection with the calibration module to identify a termination event associated with the calibration module. A termination event may be any event which results in the closing of the calibration module and/or the terminating of the calibration event. For example, the termination event may include, but is not limited to, a forced quit, a frozen or non-responsive state, a crash, an unexpected exit, a reloading of the calibration module, a request to uninhibit the color device from the calibration module, or the successful completion of the calibration event.

Upon identification of the termination event, the color management module facilitates the application of a color profile to the color device. In an embodiment, the color management module may instruct the policy module to apply the color profile to the color device. The instruction may be for the application of the current profile (previously removed to allow the calibration event to be performed), another profile on the profile list, or a newly created profile (i.e., a profile created as a result of the calibration event). In one embodiment, the message communication system alerts the color management module that a management subsystem (i.e., a process) has terminated and that the associated connection has also been terminated.

In an embodiment, the color management module maintains a profile list including one or more profiles associated with each of the color devices of the computing system. Upon detection of a request to inhibit a color device, the color management module may remove the profile list for the color device.

In an embodiment, the calibration module utilizes a connection of the message communication system to send a request to inhibit a color device in advance of a desired calibration event. When the calibration module is terminated, it will drop off of the message communication system. The color management module monitors the message communication system connection and automatically, in response to the calibration module falling off of the message communication system, restores the profile list for the color device and facilitates the application of a color profile to the color device (e.g., via an instruction to the policy module to apply the color profile).

Advantageously, applying a color profile to a color device following a calibration event in response to the termination event avoids the color device being left in its native state. This allows a user to readily detect if there was a premature termination of the calibration event.

Moreover, embodiments of the present invention address the problem which arises when a calibration event is interrupted when it is nearly complete (e.g., 95% complete)—and the difference between the partially completed calibration and the user's expectations can not be detected by the human eye. Instead, applying a current profile (i.e., a profile that was applied to the color device prior to the calibration event) when the calibration module and/or calibration event is terminated, regardless of how much of the calibration event was completed, provides the user with a visual cue (i.e., the difference between the current profile and what is expected following the calibration event) to detect that the calibration event was interrupted prior to completion. In such instances, by restoring the color device to a previous profile, a user may more readily determine, through a visual inspection, that the calibration event was not completed.

In an embodiment, the color management module is configured to maintain a profile list, the profile list including one or more color profiles associated with the color devices of the computing system in accordance with mapping conditions, policies, profiles and rules maintained in an associated memory. The policy module is configured to supply the color management module with one or more parameters to be able to select the correct color profile to be applied to the color device. For instance, the policy module may "hint" (i.e., provide one or more parameters) to the color management module that the color profile should be one that is suitable for a low light condition, and the color management module may use the hint (or parameter(s)) in modifying the selection of the color profiles returned to the policy module. One having ordinary skill in the art will appreciate that the policy module and the color management module may be configured as a single component of the computing system, or may be configured as separate components.

In an embodiment, the policy module typically runs in the user session, and is has the same privileges as the user. In certain instances, this is required as some color devices cannot be accessed from a system scope due to UNIX permissions. For example, only the user session knows the X Windows secure cookie, which allows the policy module to upload new display correction ramps to the color display. The color management module is in the system context to allow other software in the system context to register color devices and query for color profiles. The split system/session model allows much greater flexibility and does not restrict color devices or color profiles to either the session or system context.

In an embodiment, a color device may be registered for a particular session and a particular user. In such instances, the color device is assigned a color characterization profile that is specific to that session and/or the user. The color management module may determine a session identifier (ID) and/or a user ID in order to assign the appropriate color characterization profile to the registered color device. For example, a first user (User 1) may engage in a session and have the color device (Printer XYZ) that he or she is using registered with an association to his or her color characterization profile (Profile U1). Furthermore, a second user (User 2) may subsequently initiate a session wherein he or she is using Printer XYZ, the color management module can properly assign User 2's color characterization profile (Profile U2) to that color device. The two profiles (Profile U1 and Profile U2) are associated with the color device (Printer XYZ) in the profile list.

Accordingly, an efficient mechanism is provided that inhibits the application of a color profile to a color device during a calibration event performed by a calibration module. Furthermore, the system and method according to embodiments of the present invention are configured to apply a color profile to the color device following termination of the calibration event, such that partial or incomplete calibration events can be detected by a user. Advantageously, once the requesting or calling process (i.e., the calibration module) is terminated, the corresponding message communication system connection is closed and the termination is detected by the color management module. In response, the color management module may restore a profile list associated with the color device and instruct a policy module to apply a color profile to the color device, thereby transitioning the color device from a native or partially calibrated state.

FIG. 1 is a block diagram of exemplary color device management system 100 according to embodiments of the invention. The color device management system 100 includes a color management module 110 configured to manage multiple color devices 140 (e.g., Color Device 1, Color Device 2, Color Device 3, . . . Color Device N). The color management module is a hardware and/or software component (i.e., a set of instructions executable by a processing device of the color device management system 100) configured to perform the actions described in detail below with regard to FIG. 2.

As shown in FIG. 1, the color management module 110 is communicatively connected to a calibration module 130 via a message communication system 120 via a connection. The message communication system 120 provides for inter-process or inter-application communications, such as communications between the calibration module 130 and the color management module 110 relating to the management of a calibration event. In an exemplary embodiment, the message communication system 120 includes a D-bus.

One having ordinary skill in the art will appreciate that the message communication system 120 may include multiple connections and may provide a communication link between the color management module 110 and the calibration module 130 using any of the multiple connections, however, a single connection is shown in FIG. 1 for illustrative purposes.

In an embodiment, the color management module 110 includes a profile repository 115. The profile repository 115 may be a computer-readable data store maintained in a memory associated with the color management module. The profile repository includes a profile list for the color devices 140 of the computing system, wherein the profile list includes one or more profiles that are associated with each color device 140.

The calibration module 130 may be any software program or daemon executable by a processing device of the computer management system 100 to manage one or more calibration events associated with the color devices 140. One having ordinary skill in the art will appreciate that the color device management system 100 may include one or more processing devices communicatively connected and configured to execute and manage the modules and devices shown in FIG. 1.

As shown in FIG. 1, the color management module 110 is coupled to a policy module 150. The policy module 150 may be any software program or daemon executable by a processing device of the computer management system 100 to receive instructions from the color management module 110 relating to the application of a color profile to the color devices 140. In an embodiment, the policy module 150 receives a communication from the color management module 110 including the profile list associated with a color device. The policy module 150 includes a policy repository 155 which stores rules, policies, conditions, mappings, and the like to enable the policy module 150 to determine which color profile to apply to a respective color device. In an embodiment, the color management module 110 determines the color profile based on inputs from the requesting framework (e.g., the calibration module 130), wherein exemplary inputs include a device identifier (ID), a user ID, or a light condition. In an embodiment, the policy module 150 applies the profile to the color device while the color management module 110 maps of the color profile to the color device.

Figure 2:
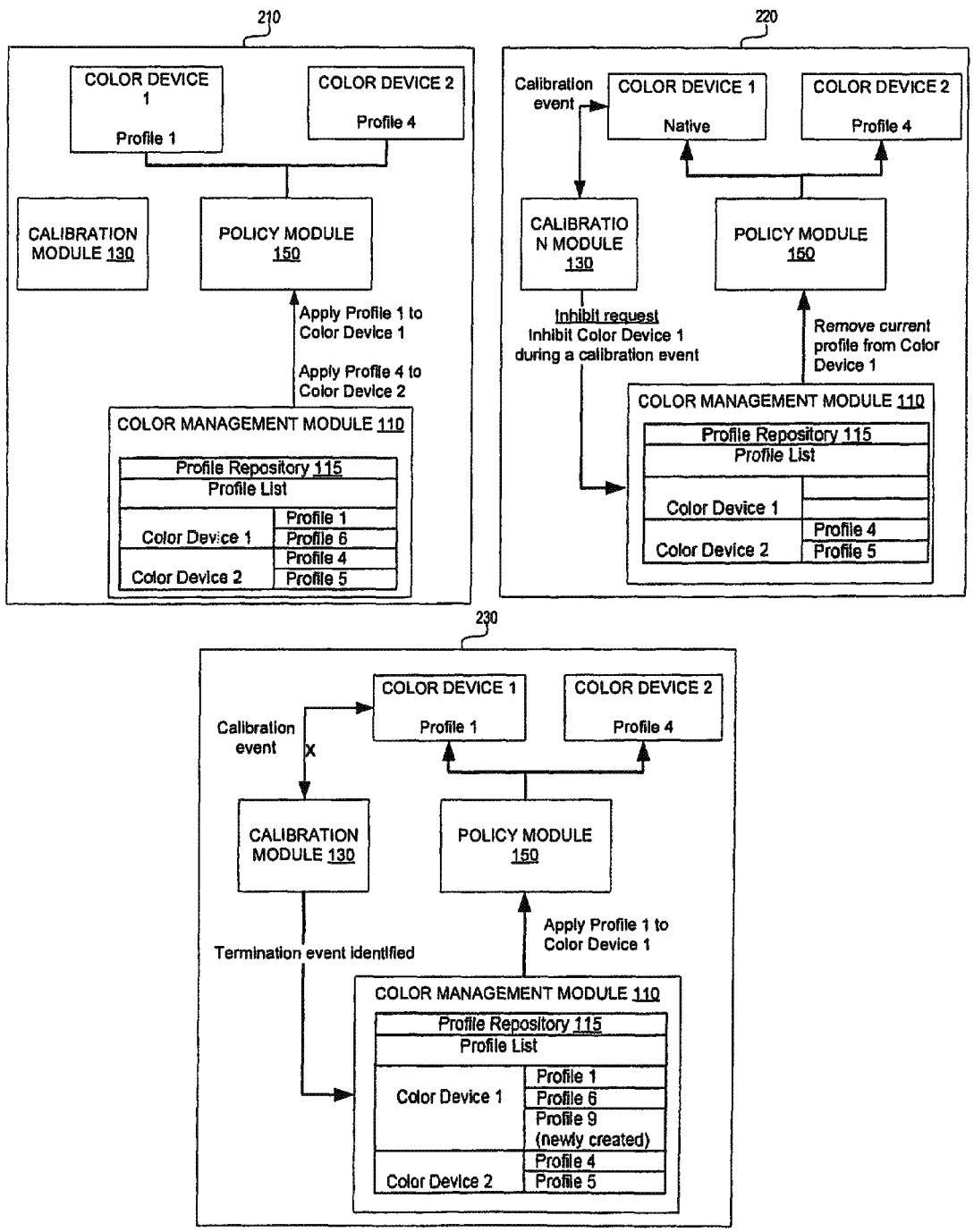
FIG. 2 is a flow diagram of a method for managing a calibration event, according to an embodiment of the present invention.

FIG. 2 is a schematic and process flow diagram of one embodiment of a method 200 for managing the application of color profiles to color devices in connection with a calibration event. The method is performed by processing logic that may comprise hardware (circuitry, dedicated logic, etc.), software (such as is run on a general purpose computer system or a dedicated machine), or a combination of both. In one embodiment, the method is performed by components of a color device management system 100 (e.g., the color management module 110, the calibration module 130 and the policy module 150 of FIG. 1).

Referring to FIG. 2, in block 210, an exemplary computing system is shown including two color devices—Color Device 1 and Color Device 2. Prior to a calibration event, a color management module 110 maintains a profile list in a profile repository 115 which includes a listing of profiles associated with the two color devices. In this example, according to the profile list, Color Device 1 is associated with Profiles 1 and 6, and Color Device 2 is associated with Profiles 4 and 5. In block 210, color management module 110 communicates an instruction to the policy module 150 to apply Profile 1 to Color Device 1 and Profile 4 to Color Device 2. The applied color profiles are shown in the respective schematic boxes for each color device.

In block 220, upon initiation of a calibration event by the calibration module 130, a request to inhibit application of a color profile to a color device is detected by the color management module 110. In the illustrated example, the calibration module 130 initiates a calibration event for Color Device 1. Accordingly, the inhibit request indicates that the application of a color profile to Color Device 1 is to be inhibited during the calibration event. In response to detection of the inhibit request, the color management module 110 removes or clears the profile list associated with Color Device 1 from the profile repository 115, such that there are no profiles associated with Color Device 1. The removal of Color Device 1's profile list is communicated to the policy module 150 and serves as an instruction to the policy module 150 to remove the currently applied profile (i.e., the current profile) from Color Device 1. In this example, the policy module 150 removes Profile 1 from Color Device 1 and places Color Device 1 in its native state. The removal of the profile list associated with Color Device 1 from the profile repository 115 may be communicated to the policy module 150 in any suitable fashion, including but not limited to, the policy module 150 requesting and retrieving the profile list from the color management module 110 or the color management module 110 sending a communication to the policy module 150 including the now cleared profile list for Color Device 1. As shown in block 320, Color Device 1 is in its native state and the calibration event is performed.

In block 230, the calibration event is terminated (as denoted by the "X" in FIG. 2) and a termination event is identified by the color management module 110. In response to the identification of the termination event, the color management module 110 restores the profile list for Color Device 1. Restoration of the profile list for Color Device 1 results in a communication to the policy module 150 to apply a profile to Color Device 1. In the example shown in FIG. 2, policy module 150 is instructed to re-apply Profile 1 to Color Device 1. One having ordinary skill in the art will appreciate that another color profile could be applied to Color Device 1, in accordance with the profile list and associated policies managed by the policy module 150. For example, if the termination event included the completion of the calibration event, a newly created profile resulting from the calibration event may be generated and added to the profile list (e.g., Profile 9 in FIG. 2). In this case, the newly created profile may be applied to Color Device 1. In another example, if the termination event included an interruption of the calibration event prior to the event's completion, a previously maintained profile (e.g., the current profile or some other profile) may be applied to the Color Device 1.

Figure 3:
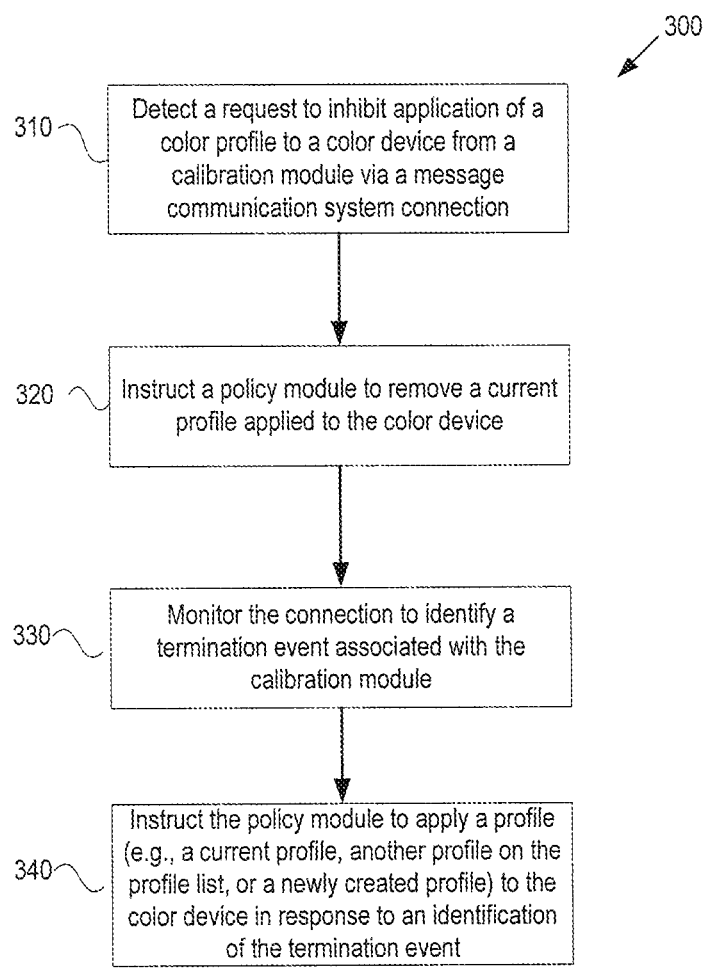
FIG. 3 is an exemplary block diagram and process flow for managing a calibration event, according to an embodiment of the present invention.

FIG. 3 is a process flow diagram of an embodiment of a method 300 for managing the application of color profiles to color devices in connection with a calibration event. The method is performed by processing logic that may comprise hardware (circuitry, dedicated logic, etc.), software (such as is run on a general purpose computer system or a dedicated machine), or a combination of both. In one embodiment, the method is performed by a component of a color device management system 100 (e.g., the color management module 110 of FIG. 1).

With reference to FIG. 3, method 300 begins when the color management module 110 detects a request to inhibit application of a color profile to a color device, in block 310. The inhibit request is generated in response to a calibration module 130 initiating a calibration event with regard to one or more color devices 140. The inhibit request is communicated to the color management module 110 via a message communication system connection (e.g., a connection of the message communication system 120 of FIG. 1). In an embodiment, the inhibit request is detected by the color management module 110 by monitoring a connection of a message communication system 120 (e.g., a D-bus) used for communications between the calibration module 130 and the color management module 110.

In response to the inhibit request, the color management module 110 instructs a policy module 150 to remove a current profile applied to the color device which is the subject of the calibration event, in block 320. One having ordinary skill in the art will appreciate that the color management module 110 may communicate the instruction to the policy module 150 according to any known delivery technique, messaging system, protocol, or format. In an embodiment, the color management module 110 communicates with the policy module 150 via the message communication system 120, such as, for example, a D-bus.

In an embodiment, in response to the inhibit request, the color management module 110 removes the profile list associated with the color device that is the subject of the calibration event. The removal of the profile list from the profile repository associated with the color management module 110 signals to the policy module 150 that the color device has no associated profiles, and in response, the policy module 150 applies no profile to the color device, placing the color device in its native state.

In block 330, the color management module 110 monitors the connection used to communicate with the calibration module 130 to identify a termination event associated with the calibration module 130. The termination event may include any activity that results in the termination of the calibration module and/or the calibration event, such as, for example, a forced quit, crash, unexpected exit, a reload, a request to uninhibit the color device from the calibration module, or the successful completion of the calibration event. In an embodiment, the color management module 110 identifies the termination event by recognizing when a service name and/or address associated with the calibration module 130 is removed from the message communication system 120.

In block 340, following the identification of the termination event, the color management module 110 instructs the policy module to apply a profile to the color device. In an embodiment, the color management module 110 restores the previously removed profile list associated with the color device. The profile applied to the color device following the termination event may be the current profile (i.e., the profile that was applied prior to the calibration event), another profile from the restored profile list, or a newly created profile (e.g., a profile created as a result of the calibration event). Advantageously, according to an embodiment, by applying a color profile to the color device in response to the termination event, the computer system maintains devices which are not left in their native state following an interrupted or terminated calibration event.

In an embodiment, the color management module 110 facilitates the return of the current profile to the color device. This is beneficial in cases where the calibration event is partially completed and the difference between a fully completed calibration and the partial calibration is not detectable by the human eye. In those cases, restoration of the current profile provides a visual signal to a user since the visually perceptible differences between the current profile and the expected result of the calibration event will be apparent.

Figure 4:
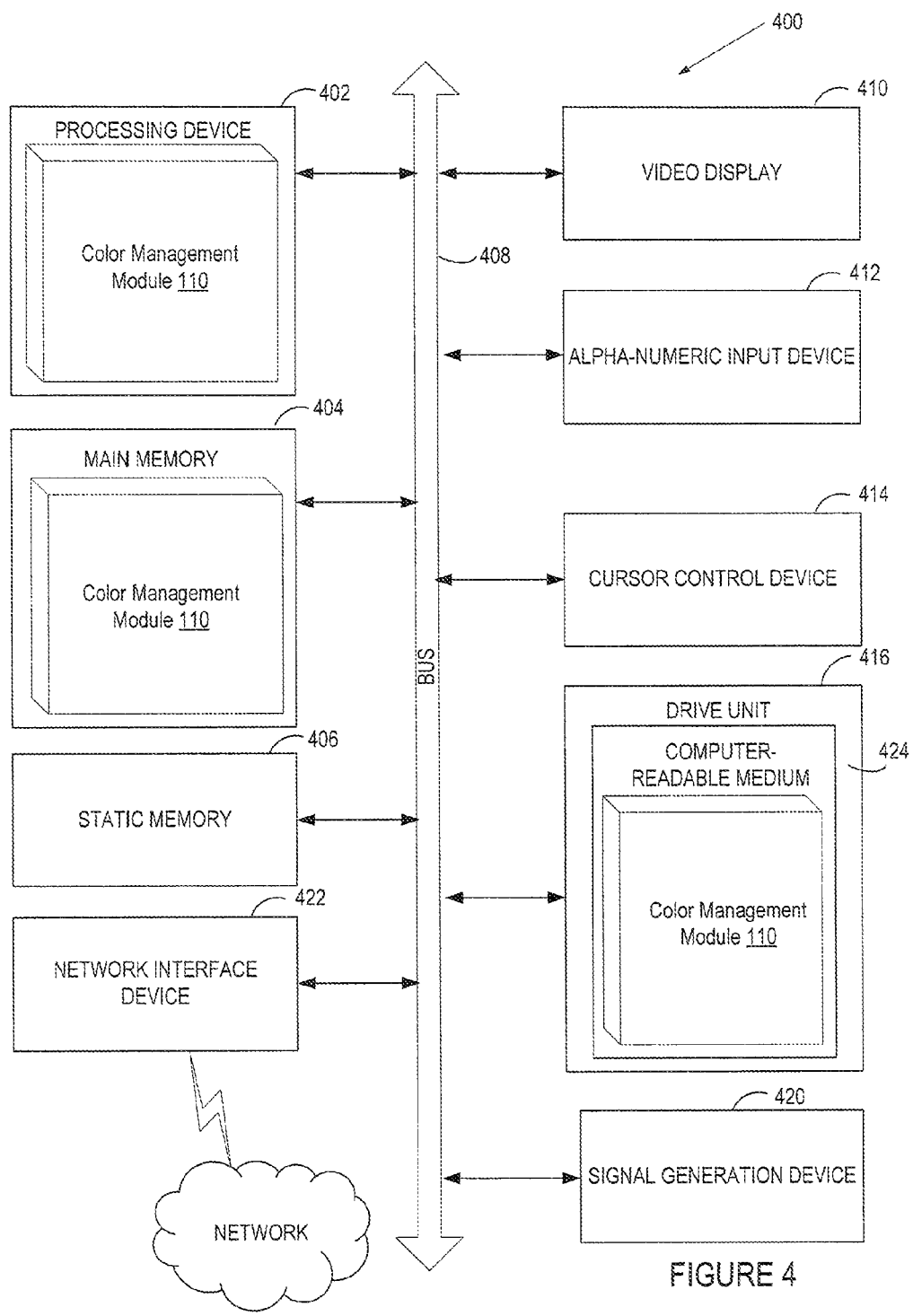
FIG. 4 illustrates an exemplary color device management system.

FIG. 4 illustrates an exemplary color device management system 400 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary color device management system 400 includes a processing device (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The color management module 110 in FIG. 1 may comprise processing device 402 configured to perform the operations and steps discussed herein.

The color device management system 400 may further include a network interface device 422. The color device management system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

A drive unit 416 may include a computer-readable medium 424 on which is stored one or more sets of instructions (e.g., instructions of color management module 110) embodying any one or more of the methodologies or functions described herein. The instructions of the color management module 110 may also reside, completely or at least partially, within the main memory 404 and/or within the processing device 402 during execution thereof by the color device management system 400, the main memory 404 and the processing device 402 also constituting computer-readable media. The instructions of the color management module 110 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "removing", "monitoring", "applying", "restoring" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for managing a color calibration, comprising:
   detecting, by a color management module of a computer system, a request to inhibit application of a current color profile to a color device from a calibration module via a message communication system connection;
   in response to the request, removing the current color profile applied to the color device;
   monitoring, by the color management module, the connection to identify a termination event associated with the calibration module; and
   applying the current color profile or another color profile to the color device in response to an identification of the termination event.

2. The computer-implemented method of claim 1 further comprising removing, by the color management module, a profile list comprising one or more color profiles associated with the color device in response to the request.

3. The computer-implemented method of claim 1 further comprising restoring, by the color management module, the profile list in response to the identification of the termination event.

4. The computer-implemented method of claim 1, wherein monitoring comprises querying the connection to identify the termination event.

5. The computer-implemented method of claim 1, wherein monitoring comprises watching the connection used for the request to inhibit to determine if a service name associated with the calibration module is removed from the connection.

6. The computer-implemented method of claim 1, wherein the termination event comprises at least one of a crash of the calibration module, an exit of the calibration module, a request to uninhibit the color device from the calibration module, a removal of a service name associated with the calibration module from the connection, or a reloading of the calibration module.

7. The computer-implemented method of claim 1, wherein the message communication system comprises an inter-process communication bus.

8. A non-transitory computer readable storage medium including instructions that, when executed by a processing device, cause the processing device to perform operations comprising:
   detecting a request to inhibit application of a current color profile to a color device from a calibration module via a message communication system connection;
   in response to the request, removing the current color profile applied to the color device;
   monitoring the connection to identify a termination event associated with the calibration module; and
   applying the current color profile or another color profile to the color device in response to an identification of the termination event.

9. The non-transitory computer readable storage medium of claim 8, wherein the method further comprises removing a profile list comprising one or more color profiles associated with the color device in response to the request.

10. The non-transitory computer readable storage medium of claim 8, wherein the method further comprises restoring the profile list in response to the identification of the termination event.

11. The non-transitory computer readable storage medium of claim 8, wherein monitoring comprises querying the connection to identify the termination event.

12. The non-transitory computer readable storage medium of claim 8, wherein monitoring comprises listening to the connection used for the request to inhibit to determine if a service name associated with the calibration module is removed from the connection.

13. The non-transitory computer readable storage medium of claim 8, wherein the termination event comprises at least one of a crash of the calibration module, an exit of the calibration module, a request to uninhibit the color device from the calibration module, a removal of a service name associated with the calibration module from the connection, or a reloading of the calibration module.

14. The non-transitory computer readable storage medium of claim 8, wherein the message communication system comprises an inter-process communication bus.

15. A computer system comprising:
a server having:
a memory,
a processing device, coupled to the memory, and
a color management module, executed from the memory by the processing device, to:
detect a request to inhibit application of a current color profile to a color device from a calibration module via a connection of a message communication system,
in response to the request, send an instruction causing a removal of the current color profile applied to the color device,
monitor the connection to identify a termination event associated with the calibration module, and
send an instruction causing an application of the current color profile or another color profile to the color device in response to an identification of the termination event.

16. The computer system of claim 15, wherein the color management module is configured to remove a profile list comprising one or more color profiles associated with the color device in response to the request.

17. The computer system of claim 15, wherein the color management module is configured to restore the profile list in response to the identification of the termination event.

18. The computer system of claim 15, wherein the color management module is configured to query the connection to identify the termination event.

19. The computer system of claim 15, wherein the color management module is configured to listen to the connection used for the request to inhibit to determine if a service name associated with the calibration module is removed from the connection.

20. The computer system of claim 15, wherein the termination event comprises at least one of a crash of the calibration module, an exit of the calibration module, a request to uninhibit the color device from the calibration module, a removal of a service name associated with the calibration module from the connection, or a reloading of the calibration module.

21. The computer system of claim 15, wherein the message communication system comprises an inter-process communication bus.

* * * * *